United States Patent [19]

Grinsteiner

[11] Patent Number: 4,653,688
[45] Date of Patent: Mar. 31, 1987

[54] THERMOSTAT WITH BYPASS VALVE

[75] Inventor: James J. Grinsteiner, Roselle, Ill.

[73] Assignee: Navistar International Corporation, Chicago, Ill.

[21] Appl. No.: 795,682

[22] Filed: Nov. 6, 1985

[51] Int. Cl.$^4$ .............................................. F01P 7/02
[52] U.S. Cl. ..................................... 236/34.5; 251/358
[58] Field of Search .................... 236/34.5; 137/625.5; 251/357, 358

[56] References Cited

U.S. PATENT DOCUMENTS

| | | | |
|---|---|---|---|
| 122,494 | 1/1872 | Russell | 251/357 X |
| 222,727 | 12/1879 | Peck | 251/358 X |
| 1,935,938 | 11/1933 | Buck | 251/358 |
| 2,595,012 | 4/1952 | Smith | 137/630.19 |
| 2,659,566 | 11/1953 | Rand | 251/358 |
| 2,953,165 | 9/1960 | Reynolds | 137/625.4 |
| 2,976,010 | 3/1961 | Huthsing, Sr. | 251/358 X |
| 2,982,477 | 5/1961 | Drapeau | 236/34.5 |
| 3,511,475 | 5/1970 | Pfau | 251/357 X |
| 3,911,950 | 10/1975 | Lowe et al. | 251/358 X |
| 4,257,553 | 3/1981 | Slicer et al. | 236/34.5 |
| 4,337,733 | 7/1982 | Hirata et al. | 123/41.1 |

FOREIGN PATENT DOCUMENTS

| | | | |
|---|---|---|---|
| 28127 | of 1911 | United Kingdom | 251/358 |
| 2002090 | 2/1979 | United Kingdom | 251/358 |

Primary Examiner—William E. Tapolcai
Attorney, Agent, or Firm—F. David Au Buchon; Dennis K. Sullivan

[57] ABSTRACT

A choke-type thermostat is provided with a bypass valve. The inventive thermostat has a pliable valve member which prevents flow to an engine coolant bypass when the thermostat is in the completely open position in regards to an engine radiator outlet. Valving of the engine coolant bypass provides maximum flow to the radiator outlet when the thermostat is in the open position. Since the engine bypass is valved off by the thermostat when the thermostat is in the open position the diameter of the engine coolant bypass may be increased therefore allowing increased flow therethrough when the thermostat is in a closed position.

10 Claims, 2 Drawing Figures

THERMOSTAT WITH BYPASS VALVE

BACKGROUND OF THE INVENTION

The field of the present invention is that of thermostats. More particularly, the field of the present invention is a choke-type thermostat for automotive engines. The present invention may be utilized on the thermostat described and disclosed in U.S. patent application "DOUBLE SEAL THERMOSTAT" Grinsteiner et al. Ser. No. 738,621 filed May 28, 1985.

DISCLOSURE STATEMENT

Thermostats typically control engine temperature by allowing selective passage of engine coolant from the engine coolant outlet to a radiator or to an engine coolant bypass passage. Automotive engine thermostats are two major kinds, poppet and choke. Poppet-type thermostats have a plate which covers a valve seat separating the radiator passage from the engine coolant passage. To open during operation, the plate of the poppet-type thermostat must overcome the fluid pressure of the engine coolant system. This causes the poppet-type thermostat to rapidly open and shut, therefore the poppet-type thermostat does not display smooth operating characteristics. An example of a poppet-type thermostat is described in Sliger et al. U.S. Pat. No. 4,257,553. Choke-type thermostats have a sealing member shaped like a cylinder and are configured to be non-pressure dependent. Choke-type thermostats thus are better suited for engines which operate at higher engine coolant system pressures.

An engine that has a thermostat in the coolant system will require a bypass that allows coolant to flow through the engine, bypassing the heat exchanger (radiator) when the thermostat is closed. This closed circuit will allow the coolant to warm-up to a proper temperature required for engine performance and passenger comfort before the thermostat opens.

The cross-sectional area of the bypass determines the amount of coolant circulated during engine warm-up. If insufficient coolant is circulated, parts of the engine may overheat. However, the bypass must be smaller than the heat exchanger conduit so that coolant will flow through the heat exchanger when the thermostat is open. When a warm engine under load requires more coolant, it may be necessary to regulate or close off this bypass flow and direct all of the coolant through the heat exchanger to achieve adequate cooling.

A thermostat which valves the flow of fluid to the engine bypass is illustrated in Hirata et al. U.S. Pat. No. 4,337,733 in FIGS. 6 and 8. The thermostat illustrated in Hirata et al. has several disadvantages. One disadvantage is that the Hirata et al. thermostat is a poppet-type thermostat and has the inherent operational disadvantage of poppet-type thermostats previously mentioned. Another disadvantage of the poppet-type thermostat when used to valve the bypass opening is the close manufacturing tolerances which are required. The dimension of the length of the thermoelongating pin when the thermostat is reaching the desired fully open position (in regard to the radiator outlet) is critical since the pin must elongate to the proper length to seal off the bypass opening. If the thermoelongating pin elongates too much, the thermostat may be permanently warped or damaged.

The dimension between the seat of the thermostat (determined by the flat machined in the engine) and the valve seat of the engine bypass opening also requires close machining tolerances for the reasons previously described for the thermoelongating pin.

Still another disadvantage of the poppet-type thermostats which are used to valve the bypass opening is that when the engine for some reason overheats, such as in the loss of coolant, the thermoelongating pin may lengthen to such a point that it may be ruptured or damaged.

SUMMARY OF THE INVENTION

To overcome the disadvantages of prior thermostats the present invention is brought forth. The present invention is a choke-type thermostat with a pliable valve member projecting opposite the thermostat valve seat for valving the bypass opening. The pliable valve member is flexible and will absorb manufacturing tolerances by deflecting without restricting the telescopic or elongating motion of the thermostat. The added bypass valve will operate independently of the coolant pressure permitting smooth gradual changes in coolant flow.

It is an object of the present invention to provide a thermostat which operates independent of coolant pressure. It is an object of the present invention to provide a thermostat which can valve the bypass opening while at the same time being able to tolerate greater manufacturing tolerances. It is also an object of the present invention to provide a thermostat which allows the bypass opening to have an enlarged diameter thereby allowing more flow when the thermostat is in a closed position during engine warmup conditions. It is also an object to provide a thermostat which, under hot engine conditions, shuts off flow to the engine coolant bypass thereby maximizing the flow of engine coolant to the radiator and providing maximum engine cooling.

Other objects and advantages of the present invention will become apparent to those skilled in the art as the nature of the invention is better understood from the accompanying drawings and detailed description.

DETAIL DESCRIPTION OF THE DRAWINGS

FIG. 1 is a sectional view of the inventive thermostat illustrating the left half of the thermostat in the closed position in regards to the radiator passage, and illustrating the right half of the inventive thermostat in the open position sealing off flow to the engine bypass; and FIG. 2 is an enlarged view of a portion of the thermostat circled in FIG. 1.

DETAILED DESCRIPTION OF THE DRAWINGS

Figure 1:
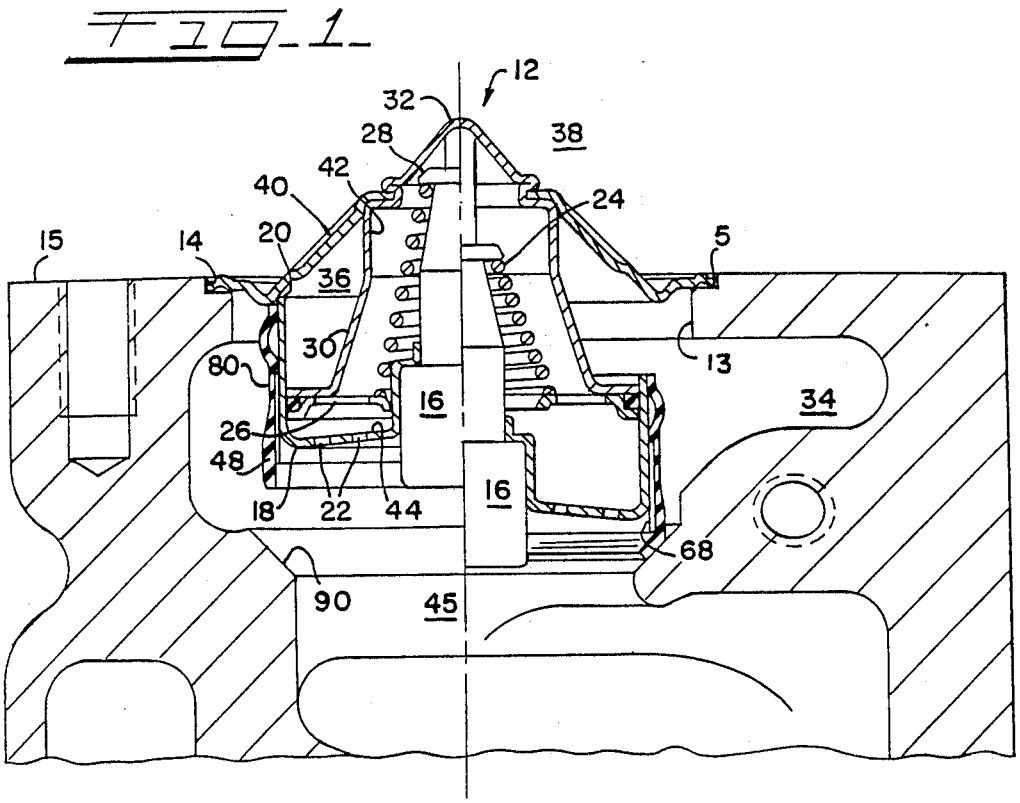
Figure 2:
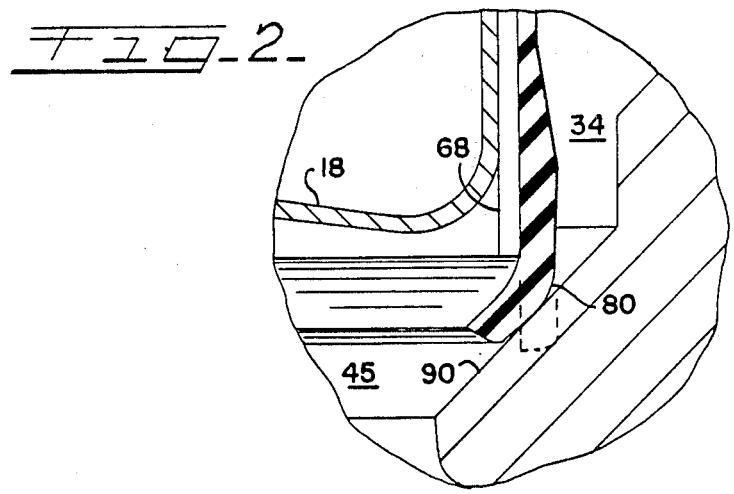

Referring to FIGS. 1 and 2, the choke-type thermostat 12 includes a circular valve seat 14 having a disc-like outer edge, an upturned conical inner portion which is installed in a machined flat 5 of aperture 13 in the coolant system of engine 15. Valve seat 14 separates the interior engine coolant inlet or passage 34 from and the radiator outlet passage 38. Fitted within the valve seat 14 along its axis thereof is a conventional thermoelongating valve pin 16. Fixably attached about the axial valve pin 16 is a cup-shaped element 18 referred to as the choke having its open end disposed adjacent the valve seat 14. The choke 18 makes sealing contact with the valve seat 14 along the sealing edge 20 at its open end.

Valve pin 16 is biased toward valve seat 14 by spring 24 which is captured between retaining base 26 and flange 28 of pin 16 as is seal ring 25. Support structures 30 and 26 are fixably connected with one another and are also fixably attached to the valve seat 14.

Spring 24 urges pin 16 toward crown 32 of supporting structure 30. This causes sealing surface 20 of choke 18 to mate with valve seat 14 preventing the coolant from flowing from engine passage 34 to control volume 36, through perforation 40, to radiator outlet 38. As the engine coolant temperature rises, pin 16 elongates axially causing fixably attached choke 18 to move away from valve seat 14 thus allowing flow to radiator outlet 38.

Choke 18 has a series of perforations 22 which allow the flow of coolant from engine outlet 34 into control volumes 44 and 42. Since the pressure within control volume 42 and 44 is equal to the pressure of the engine passage 34, movement of choke 18 away from valve seat 14 is not dependent upon engine system pressure. Since the movement of choke 18 is not pressure dependent, the choke-type thermostat will open and close in a smooth gradual manner. It will be appreciated that the foregoing is a description of a conventional single choke thermostat.

In accordance with the invention thermostat 12 additionally is provided with a sleeve-like, pliable bypass valve 48 comprising an elastomeric material projecting in a direction generally opposite valve seat 14. The bypass valve 48, in an alternative embodiment, could be thin sheet steel, spring loaded or with transverse bellow folds to make the seal pliable. Bypass valve 48 is operatively connected with pin 16 via choke 18. Bypass valve 48 can be attached directly to choke 18 or may be attached via a press fitted metal band 68 which is molded to the bypass valve inner pheriphery.

When pin 16 elongates to a position selectively connecting the engine passage 34 with the radiator outlet passage 38, the bypass valve 48 is urged to a position sealing off the engine bypass coolant opening 45.

The embodiment of the elastic valve 48 illustrated in FIG. 1 also provides for a secondary choke 80 at its end adjacent to valve seat 14. The secondary choke 80 will make sealing contact with the valve seat 14 at a predetermined length of valve pin 16 which differs from the length of the valve pin 16 when the choke 18 makes sealing contact with the valve seal 14.

To increase the effectiveness of the inventive thermostat 12 it has been found useful to provide a tapered seat on the engine coolant bypass as shown in FIG. 2 at 90. The tapered seat 90 will cause the bypass valve member 48 to crimp inwardly providing an even tighter seal.

Since the engine bypass opening 45 is shut off from the engine coolant inlet 34 by the bypass valve 48 when the thermostat 12 is open to radiator passage 38, a maximum amount of coolant will enter the radiator during hot operating conditions. Also, by being able to prevent flow to the engine bypass 45 when desired, thermostat 12 allows the engine bypass 45 to be enlarged in diameter allowing greater flow when the engine is in its initial warmup staqes. Increased coolant flow ensures more adequate cooling during the warm-up stages of engine operation.

While a few embodiments of the present invention have been explained, it will be readily apparent to those skilled in the art that other modifications can be made to the present invention without departing from the spirit and scope of this application as encompassed by the following claims.

What is claimed is:

1. A choke-type thermostat for selectively connecting a fluid inlet with a first fluid outlet and a secondary fluid outlet comprising:
   a valve set separating said inlet and said first outlet;
   a thermal elongating valve pin;
   a rigid valve choke attached to said valve pin for making sealing contact with said valve seat at a first predetermined length of said valve pin; and
   an elastomeric valve, fixedly attached to and surrounding said valve choke and projecting from said valve choke in a direction opposite said valve seat to a distal end disposed to axially engage structure surrounding said secondary outlet for sealing off said secondary outlet at a second predetermined length of said valve pin, said rigid valve choke remaining free from contact with said structure surrounding said fluid outlet.

2. A thermostat described in claim 1 wherein said elastomeric valve is attached to a metal band, said band being attached to said choke.

3. In combination with an internal combustion engine having structure defining respectively an engine fluid inlet, a heat exchanger outlet, and a heat exchanger bypass outlet, a choke-type thermostat comprising:
   a valve seat separating said inlet and said heat exchanger outlet;
   a thermal elongating valve pin disposed along the axis of said valve seat in contacting relation therewith;
   a first rigid cup-shaped valve choke attached to said valve pin for axial movement therewith and making sealing contact with said valve seat at a first predetermined length of said valve pin; and
   a sleeve-like elastomeric valve attached to and disposed about the axial periphery of said valve choke and projecting from said valve choke in a direction opposite said valve seat to a distal end of circular section, said elastomeric valve being movable with said choke causing said distal end to axially engage structure surrounding said bypass outlet to seal off said bypass outlet at a second predetermined length of said valve pin, said rigid valve choke remaining free from contact with said structure surrounding said bypass outlet.

4. The invention described in claim 1 and said bypass outlet structure being inwardly tapered into said outlet, said distal end of said elastomeric valve contacting the tapered portion.

5. A thermostat described in claim 3 wherein said elastomeric valve isattached to a metal band, said band being attached to said choke.

6. A choke-type thermostat adapted for selectively connecting an engine fluid inlet with a first fluid outlet and a secondary fluid outlet, said inlets and outlets defined by surrounding structure of an engine, comprising:
   a valve seat separating said inlet and said first outlet;
   a thermal elongating valve pin;
   a metal valve choke attached to said valve pin for making sealing contact with said valve seat to seal off said first outlet at a first predetermined length of said valve pin; and
   an elastomeric valve surrounding said valve choke being operatively connected to said valve pin and making sealing contact with said valve seat at an end of said elastomeric valve adjacent said first outlet at a second predetermined length of said valve pin: and said elastomeric valve having a second end disposed to engage structure surrounding said secondary outlet for sealing off said secondary outlet at an end of said elastomeric valve opposite said valve seat at a third predetermined length of said valve pin, said rigid valve choke remaining free from contact with said structure surrounding said secondary outlet.

7. A thermostat described in claim 6 wherein said elastomeric valve is attached to a metal band said band being attached to said choke.

8. In combination with an internal combustion engine having structure defining respectively an engine fluid inlet, a heat exchanger outlet, and a heat exchanger bypass outlet, a choke-type thermostat comprising:
 a valve seat separating said inlet and said heat exchanger outlet;
 a thermal elongating valve pin;
 a rigid metal valve choke attached to said valve pin for making sealing contact with said valve seat at a first predetermined length of said valve pin; and
 a sleeve-like elastomeric valve fixedly attached to and surrounding said valve choke and moving axially therewith to make sealing contact with said valve seat at a first end of said elastomeric valve adjacent said valve seat, and said elastomeric valve projecting axially away from said valve seat beyond said rigid metal valve choke to second end disposed to axially engage the structure surrounding said bypass outlet for sealing off said bypass outlet at an end of said elastomeric valve opposite said valve seat at a second predetermined length of said valve pin, said rigid metal valve choke remaing free from contact with said structure surrounding said bypass outlet.

9. The ivnention described in claim 8 wherein said elastomeric valve is attached to a metal band, said band being attached to said choke.

10. The invention described in claim 7 and said structuring defining said bypass outlet having a tapered surface engaging said elastomeric valve at said third predetermined length.

* * * * *